United States Patent [19]
Parkhill

[11] Patent Number: 6,099,325
[45] Date of Patent: Aug. 8, 2000

[54] ELECTRONIC CONTROL MODULE FOR AN ELECTRIC MOTOR

[75] Inventor: Scott Thomas Parkhill, Pettysburg, Ohio

[73] Assignee: Ford Motor Company, Dearborn, Mich.

[21] Appl. No.: 09/187,132

[22] Filed: Nov. 5, 1998

[51] Int. Cl.$^7$ .................................................. H01R 12/00
[52] U.S. Cl. ........................................ 439/76.1; 361/707
[58] Field of Search ........................ 439/34, 76.1, 76.2; 361/736, 707, 704; 310/71

[56] References Cited

U.S. PATENT DOCUMENTS

| | | | |
|---|---|---|---|
| 4,176,904 | 12/1979 | Obuch | 439/690 |
| 4,218,724 | 8/1980 | Kaufman | 361/736 |
| 4,769,557 | 6/1988 | Houf et al. | 307/147 |
| 4,944,684 | 7/1990 | Leibowitz | 439/76 |
| 4,952,529 | 8/1990 | Grider | 439/78 |
| 4,998,865 | 3/1991 | Nakanishi et al. | 417/423.7 |
| 5,020,996 | 6/1991 | Cheng | 439/76 |
| 5,022,717 | 6/1991 | Heibel et al. | 303/119 |
| 5,342,203 | 8/1994 | Perretta et al. | 439/76 |
| 5,382,169 | 1/1995 | Bailey et al. | 439/76 |
| 5,403,193 | 4/1995 | Ito et al. | 439/76.2 |
| 5,613,844 | 3/1997 | Tuckey et al. | 417/423.7 |
| 5,699,233 | 12/1997 | Zlamal | 439/76.2 |
| 5,764,487 | 6/1998 | Natsume | 439/76.2 |
| 5,766,026 | 6/1998 | Cooper et al. | 439/76.1 |

*Primary Examiner*—Neil Abrams

[57] ABSTRACT

An electronic control module (16) for an electric motor (12) includes a first module member (20) attached to the electric motor and a second module member (24) defining an interior for housing a circuit board (28). The second module member (24) includes a control signal connector on with control signal terminals for quick attachment and release to a control signal wire set. The second module member also includes molded in positive and negative supply blades (50, 60) spaced apart from the control signal connector (40). The second module member also includes molded in positive and negative motor blades (70, 82), also spaced apart from the control signal connector. Each of the blades (50,60,70,82) is connected to the circuit board on the inside and has an aperture external of the control module for attachment to the power supply or to the electric motor (12). A series of fasteners interconnect the blades (50, 60, 70, 82) to a positive and negative supply leads (19, 21) and to positive and negative motor leads (76, 88), respectively. The first module member (20) may be formed of cast aluminum and integrally formed with a housing (22) for a pump (164) to be driven by the motor. The circuit board (28) may be supported on a thermally conductive pad (175).

19 Claims, 3 Drawing Sheets

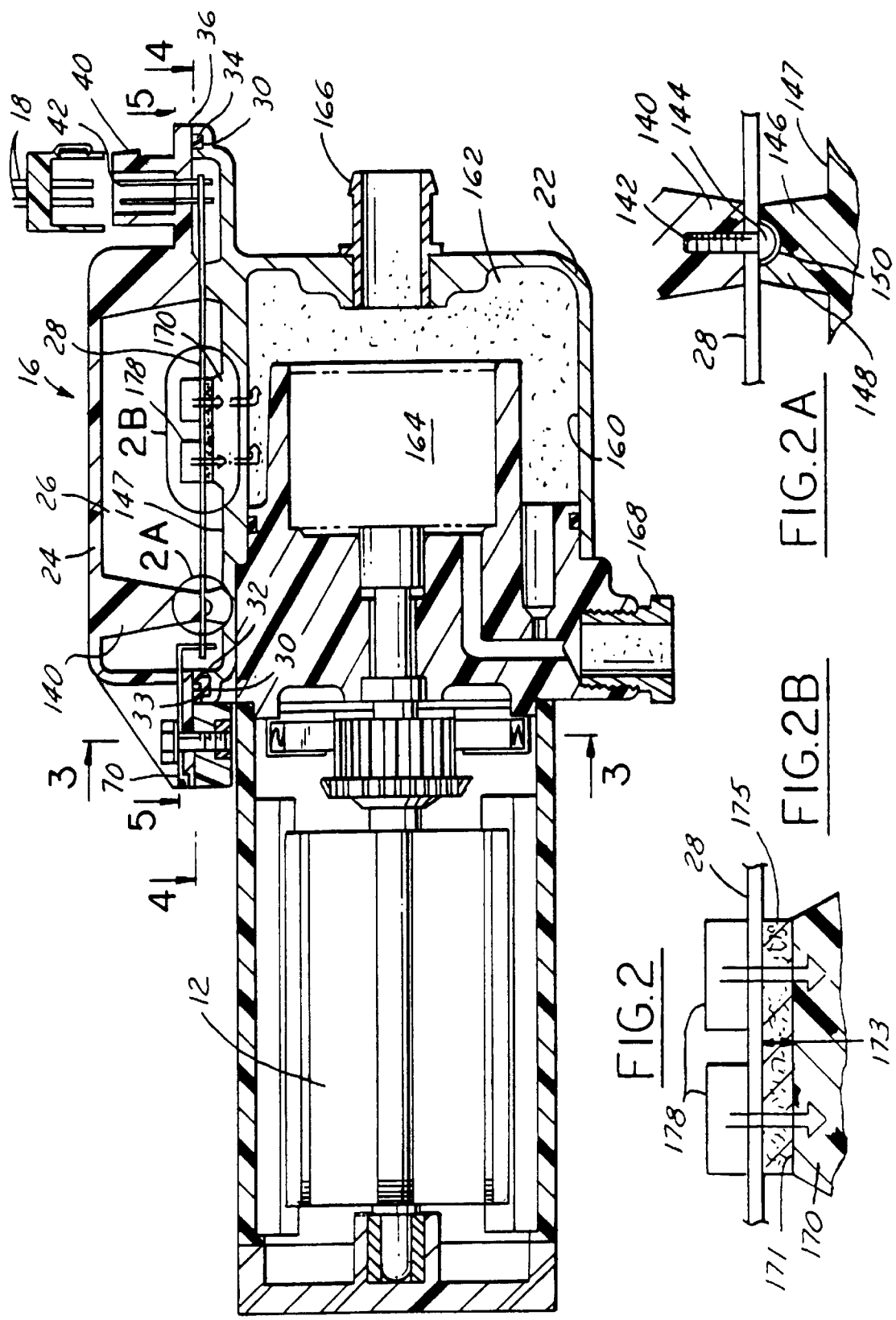

ELECTRONIC CONTROL MODULE FOR AN ELECTRIC MOTOR

BACKGROUND OF THE INVENTION

1. Field of the Invention

The present invention relates generally to electronic control modules. More particularly the present invention relates to improved electrical connections between the control module, a power source, a control signal source and device being controlled by the control module.

2. Disclosure Information

It is well known by those manufacturing control modules for use in severe environments, such as the area under the hood of an operating motor vehicle, to use male-female connector/terminal systems which rely on sliding-friction terminals, shrouds, cavity and/or floor seals, wire grommets and latching mechanisms to connect electrical harnesses to the control module. These connector systems take years to develop, and must undergo rigid testing on multiple levels to ensure that they meet expected performance. Performance challenges for such connections include good electrical conductivity and robust sealing against water intrusion in the harsh underhood environment. Additionally, most of the known connectors can handle only limited currents due to contact resistance buildup within the sliding terminal systems, and their small terminal cross-sectional area. Alternately, threaded-post-type connectors promise to carry higher current levels, however, they commonly present challenges to maintaining the seal integrity for the control module.

It would be desirable to develop a control module connector system capable of providing reliable and rapid attachment of control signal wires while also providing a high power, high current level capable connection to the module and the controlled device that does not present sealing issues for the control module. Additionally, it would be further desirable to eliminate thee shrouds, seals, sliding terminals, and latching mechanisms that require multi-level engineering development.

SUMMARY OF THE INVENTION

Therefore, the present invention provides an improvement over the previous control module electrical connections for high power devices by separating the low current level control signal connector from the high level current connectors. The high level current connectors can be quite simple, reducing cost, complexity and engineering necessary to prove out complex alternative connectors.

In accordance with the present invention, an electronic control module for an electric motor includes a first module member attached to the electric motor and a second module member defining an interior for housing a circuit board. The second module member includes a control signal connector with control signal terminals for quick attachment and release to a control signal wire set. The second module member also includes molded in positive and negative supply blades spaced apart from the control signal connector. The second module member also includes molded in positive and negative motor blades, also spaced apart from the control signal connector. Each of the blades is connected to the circuit board on the inside and an aperture external of the control module for attachment to the power supply or to the electric motor. A series of fasteners interconnect the blades to a positive and negative supply leads and to positive and negative motor leads, respectively.

It is an advantage of the present invention to provide an integrated reservoir/heat sink/control module member for an electronically controlled electric pump that allows simple, low cost manufacturing and packaging efficiencies heretofore unavailable for such applications.

BRIEF DESCRIPTION OF THE DRAWINGS

FIG. 2 is a section view of a control module, electric motor and hydraulic pump assembly in accordance with the present invention.

FIG. 2A is an enlarged view taken from FIG. 2 showing a feature of the control module in accordance with the present invention.

FIG. 2B is an enlarged view taken from FIG. 2 showing a feature of the control module in accordance with the present invention.

FIG. 2C is an enlarged view taken from FIG. 2 showing a feature of the control module in accordance with the present invention.

DETAILED DESCRIPTION OF THE PREFERRED EMBODIMENT

Figure 1:
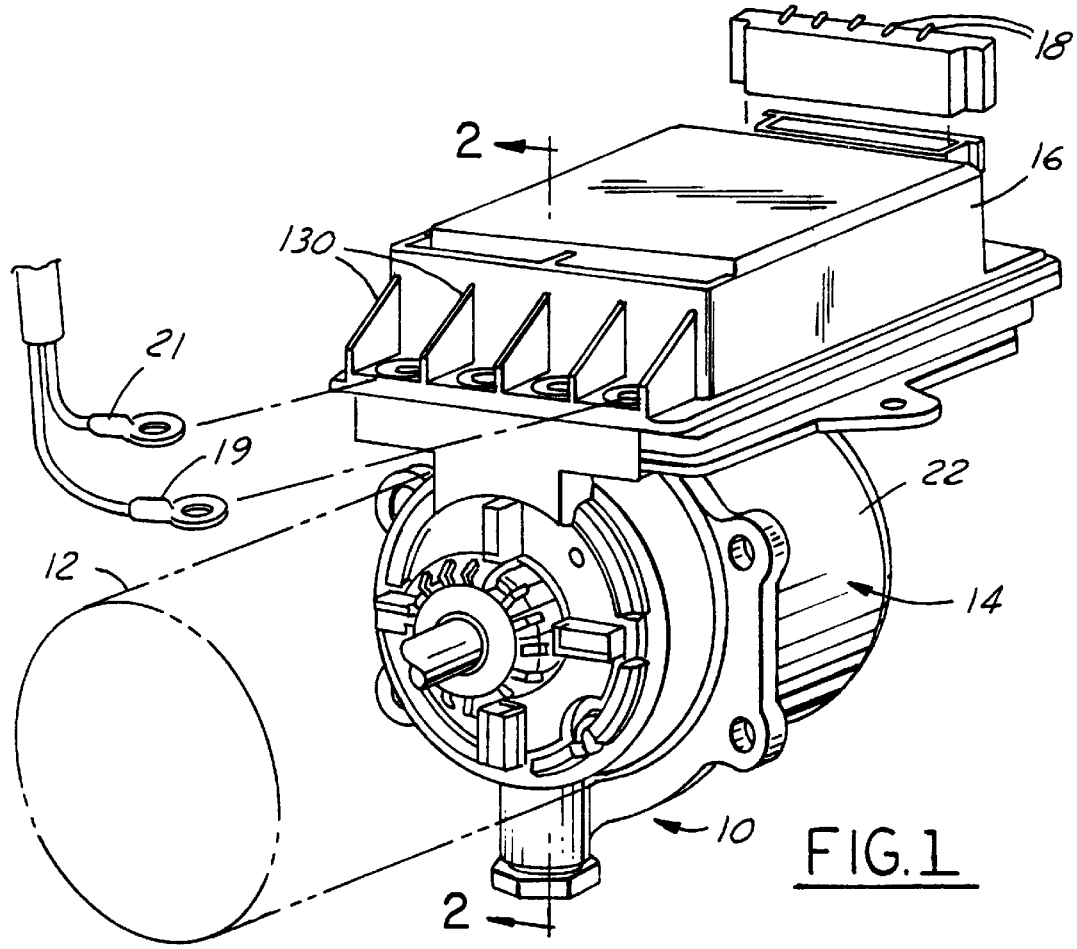
FIG. 1 is a perspective view of a control module and hydraulic pump assembly in accordance with the present invention.

Referring now to FIG. 1, an integrated power steering pump 10 is shown including an electric motor 12 for driving a hydraulic pump 14, which supplies pressurized hydraulic fluid to power steering gear (not shown). An integrated control module 16 commands the electric motor 12 through positive and negative power supply leads in response to control input signals received through a control signal wire set 18. While the present invention is being described with respect to a pump assembly for a power steering system, it should be recognized that the present invention is not so limited. The benefits of the present invention could be obtained if applied to any electrically driven pump mechanism.

Referring now to FIGS. 1 through 4, the control module 16 includes a first module member portion 20, which in the presently preferred embodiment is integrally cast with a portion of a pump housing 22. In particular, the first module member portion 20 is cast integrally with a pump reservoir 23, however, many of the benefits of the present invention can be obtained by integrally casting the first module member portion 20 with any part of the pump housing, generally be defined as the exterior components of the electro-hydraulic pump assembly The The control module 16 also includes a second module member 24 which matingly engages the first module member portion 20 forming a sealed interior 26 of the control module for containing a circuit board 28. Generally, an adhesive epoxy 33 will be located within a channel 30 such that it flows out onto a mating surface 32 of the lower module member portion 20 for sealingly engaging a mating surface 36 on the second module member. Alternatively, when desirable, the control module can be hermetically sealed by placing an elastomeric seal 34 in the channel 30 for engaging the mating surface 36 on the second module member.

Figures 3, 3A:
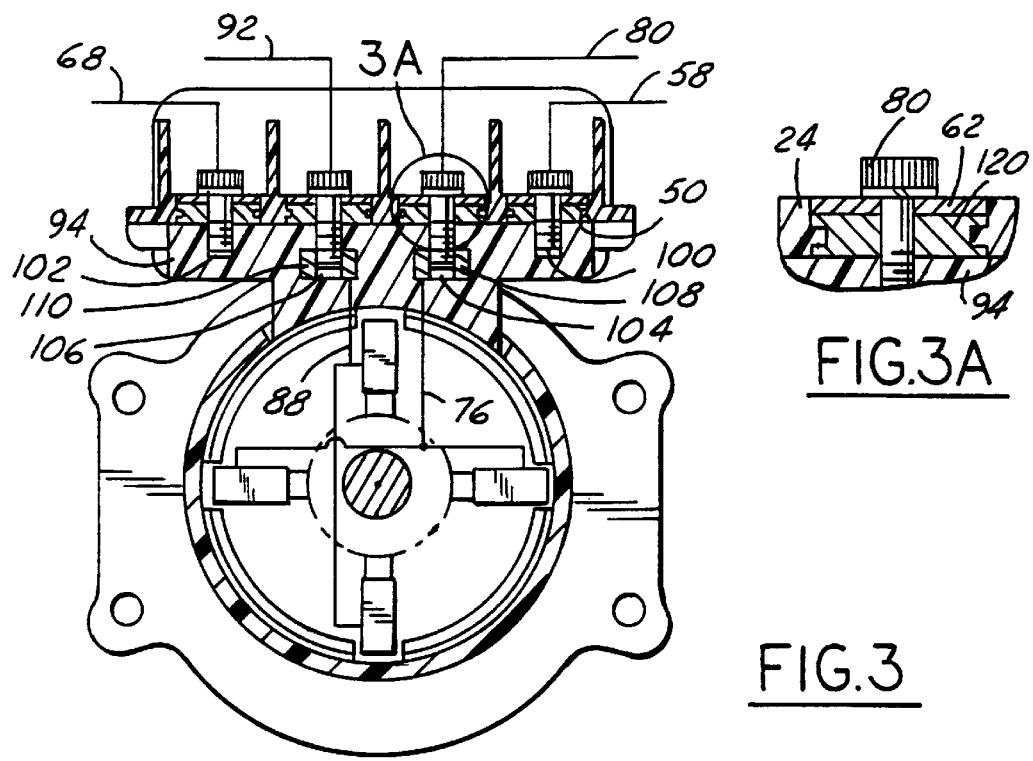
FIG. 3 is a section view taken along lines 3—3 from FIG. 2 showing fasteners and power connections constructed in accordance with the present invention.
FIG. 3A is an enlarged view taken from FIG. 3 showing a feature of a fastener and power connections constructed in accordance with the present invention.
Figure 4:
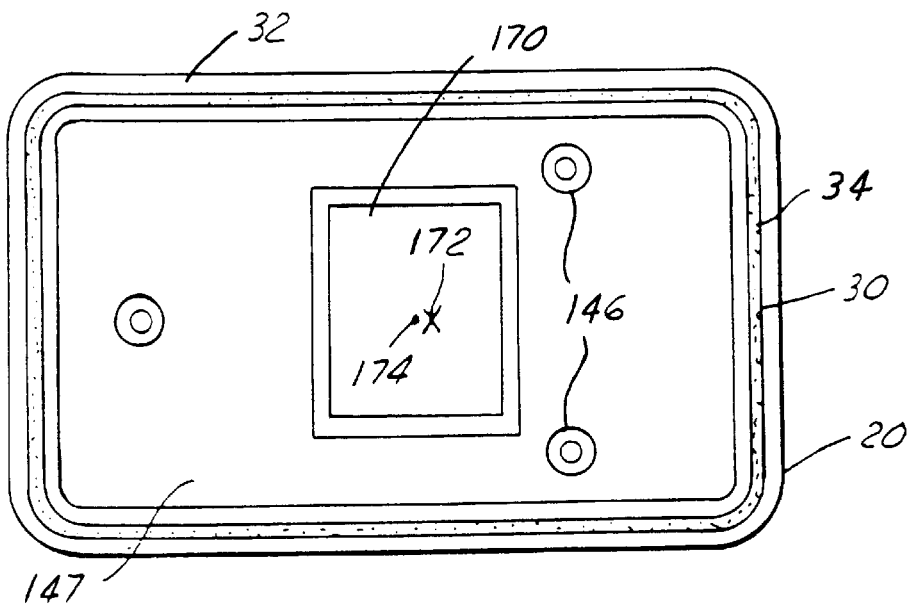
FIG. 4 is a plan view of a floor of a first module member portion constructed in accordance with the present invention.
Figure 5:
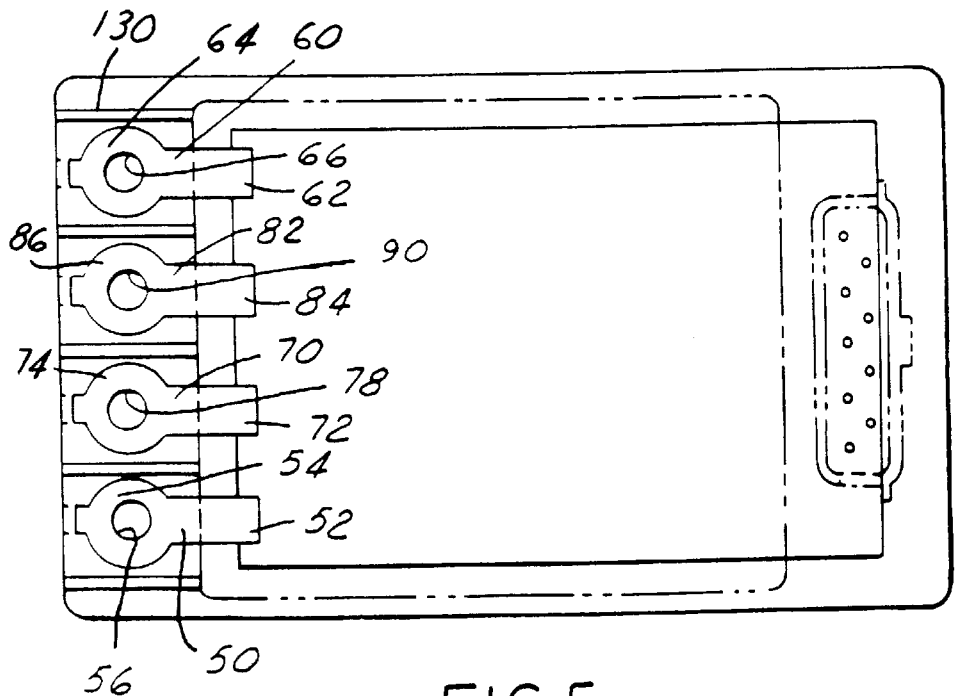
FIG. 5 is a bottom view of a circuit board disposed in a second module member in accordance with the present invention.

Referring now to FIGS. 2, 3 and 5, the second module member 24 includes an integrally molded or stitched control signal connector 40 of the type allowing quick release and attachment of the control signal wire set 18 to a set of control signal terminals 42 integrally molded or stitched and silicon potted within the control signal connector 40. The control signal terminals 42 are conductively attached to the circuit board 28. The signals transmitted through the control signal wire set are characteristically low current signals providing the control circuit with operating parameters necessary for the control module to generate appropriate electric motor control signals.

The second module member 24 also includes a high power electrical connection, purposefully spaced apart from the control signal connect to minimize interference potentially generated at the high power electical connections. The high power electrical connections include a positive supply blade 50 integrally molded or stitched and silicon potted within the second module member 24 and having a first end 52 attached to the circuit board and a second end 54 extending outside of the control module for attachment to a positive supply lead 19. In the presently preferred embodiment, the second end of the positive supply blade includes a first aperture 56 for receiving a first threaded fastener 58 therethrough.

The high power electrical connections also include a negative supply blade 60 integrally molded or stitched and silicon potted within the second module member 24 and having a third end 62 attached to the circuit board and a fourth end 64 extending outside of the control module for attachment to a negative supply lead 21. In the presently preferred embodiment, the fourth end of the positive supply blade includes a second aperture 66 for receiving a second threaded fastener 68 therethrough.

In a conventional manner, well known to those skilled in the art, the control module 16 generates electronic motor control signals and distributes power to the electronic motor through the high power electrical connections using integrally molded or stitched and silicon potted positive and negative motor blades 70, 82. The positive motor blade 70 includes a fifth end 72 attached to the circuit board and a sixth end 74 extending outside of the control module for attachment to a positive motor lead 76. In the presently preferred embodiment, the sixth end 74 of the positive motor blade includes a third aperture 78 for receiving a third threaded fastener 80 therethrough. Similarly, the negative motor blade 82 includes a seventh end 84 attached to the circuit board and a eighth end 86 extending outside of the control module for attachment to a negative motor lead 88. In the presently preferred embodiment, the eighth end 86 of the negative motor blade includes a fourth aperture 90 for receiving a fourth threaded fastener 92 therethrough.

In the preferred embodiment, the first and second fasteners 58, 68 serve to conductively interconnect the positive and negative supply leads 19, 21 to the second and fourth ends 54, 64 of the positive and negative supply blades 50, 60, respectively. Additionally, by providing first and second threaded bores 100, 102 within a motor brush card 94, the first and second threaded fasteners 58, 68 can provide a clamping force necessary to seal the control module while also serving to attach the control module to the electric motor and/or pump assembly. The multiple functions served by these fasteners can result in considerable savings in both cost and manufacturing.

The brush card 94 of the presently preferred embodiment serves both as a mounting point for the control module as well as a power distribution device for the electrical motor. While a brush card for a motor utilizing brushes is illustrated, it should be readily apparent to those skilled in the art that the benefits of the present invention would equivalently apply to a brushless motor.

The brush card 94 includes first and second blind threaded bores 100, 102 for matingly receiving first and second threaded fasteners 58, 68. The brush card 94 also includes third and fourth threaded bores 104, 106 having disposed therein first and second threaded tubular contacts 108, 110, respectively, for receiving third and fourth threaded fasteners 80, 92. The third and fourth threaded fasteners establish electrically conductive communication between the positive and negative power blades 70, 82 and the positive and negative motor leads 76, 88, respectively. It has been determined that it is desirable to locate the positive and negative motor blades 70, 82 between the positive and negative supply blades 50, 60.

Referring now to FIGS. 3 and 3A, when threaded fasteners are selected to establish the clamping force for high power electrical connectors, the second module member 24 may be molded with metallic bushings 120 disposed beneath the external ends of various blades. The metallic bushings have been shown to permit consistent torque application during assembly with minimal relaxation of the clamping force generated by the threaded fasteners. It should be noted that the threaded bushings could be threaded for engagement by the threaded fasteners if retention of the module is not performed by the particular fastener.

Referring back now to FIGS. 1, 2, and 5, the second module member also includes molded in upstanding vertical walls on either side of each of the fasteners. These upstanding vertical walls serve to isolate the conductive fasteners from outside interference and possible inadvertent electrical contact with other conductive objects. To serve this role, the upstanding walls preferably have a height equal to or greater than the installed height of the fasteners.

Referring now to FIGS. 2 and 2A, the second module member 24 also includes molded in circuit board support members. In the preferred embodiment, there are at least three such support members so that the planar circuit board can be positively supported. The circuit board is attached to the circuit board support members by retaining screws 142 having semi-spherical drive heads 144. Three pillars 146 project upwards from a floor 147 of the first module member portion and the ends 148 of each of the pillars 146 include a circular depression 150 to receive the drive heads 144 without interference. In the embodiment using an epoxy sealer 33, as shown in FIG. 2C, the height of the pillars controls the thickness of the epoxy sealer between surfaces 32, 36.

Referring now to FIGS. 2, 2B and 5, the preferred embodiment achieves enhanced control module cooling by integrally casting the first module member portion 20 of the control module with a cup-shaped reservoir 160 on the pump housing 22 from a thermally conductive material, such as aluminum. The reservoir 160 provides a large surface area, both external for transferring heat to ambient air as well as internal for transferring heat to hydraulic fluid 162 contained therein. The reservoir 160 completely surrounds a pump assembly 164 so as to maintain the pump assembly 164 submerged in the hydraulic fluid 162. The pump assembly can be any type of rotary pump suitable for being driven by an electric motor. The Reservoir includes a fluid inlet 166 and a fluid outlet 168 for communicating fluid to and from a steering mechanism.

Additional heat transfer can be achieved by providing a heat transfer platform 170 on the floor of the first module member portion. The heat transfer platform includes a top surface 171 disposed a predetermined height above the floor 147. Depending on the construction of the circuit board, the top surface may be positioned so as to be directly in contact with the circuit board when installed, or slightly below the circuit board forming a gap 173 to be filled by an electronically insulative and thermally conductive pad 175. In the preferred embodiment the pad is formed by applying a liquid compound of silicon filled with a thermally conductive filler, such as is commercially available from Dow Chemical as silicone #4168 or #4174. Of course this fluid cures to form a resilient pad after assembly, providing additional vibration damping for the circuit board.

Preferably, the heat transfer platform 170 has a first center 172 that can be positioned substantially coincident with a second center 174 created by the at least three pillars 146 in the plan view. This allows an even application of pressure between the circuit board and the heat transfer platform 170 to further enhance thermal conductivity. It is further desirable to locate electrical components 178 generating the greatest heat on the circuit board as close to the heat transfer platform as possible for a given design to further enhance thermal efficiency.

As previously noted, the preferred embodiment uses a die-cast aluminum for the lower module member for its heat transfer properties. Additionally, the second module member is preferably injection molded from a glass-filled plastic for its durability and electrical insulative properties. Finally, the silicon used for potting the flat blades and the signal connectors in the second module member is preferably of the UV/moisture curing type. It should be noted that these conductors can be either or both molded and potted into the second module member by conventional practices well known to those skilled in the art.

Various modifications and variations will no doubt occur to those skilled in the art to which this invention pertains. For instance, it should be recognized that the present invention applies to any control modules that manage high levels of current to power the devices they control, whether it be an electrical drive motor for a pump or some other electrical device. Any such device would benefit from the various advantages the present invention offers. These and all other variations which basically rely on the teachings by which this disclosure has advanced the art are properly considered within the scope of this invention as defined by the appended claims.

What is claimed is:

1. An electrical control module for an electric motor comprising:

a first module member adapted to be attached to said electric motor;

a second module member, together with said first module member defining an interior for housing a circuit board therein;

control signal connector means on said second module member and having therein control signal terminals, said control signal connector means allowing quick attachment and release of a control signal wire set to said control signal terminals;

a positive supply blade molded in said second module member spaced apart from said control signal connector means and having a first end disposed within said interior and connected to said circuit board and a second end protruding externally from said interior;

a negative supply blade molded in said second module member spaced apart from said control signal connector means and having a third end disposed within said interior and connected to said circuit board and a fourth end protruding externally from said interior;

a positive motor blade molded in said second module member spaced apart from said control signal connector means and having a fifth end disposed within said interior and connected to said circuit board and a sixth end protruding externally from said interior;

a negative motor blade molded in said second module member spaced apart from said control signal connector means and having a seventh end disposed within said interior and connected to said circuit board and a eighth end protruding externally from said interior;

first fastener means for conductively connecting a positive supply lead to said second end of said positive supply blade;

second fastener means for conductively connecting a negative supply lead to said fourth end of said negative supply blade;

third fastener means for conductively connecting said sixth end of said positive motor blade to a positive motor lead;

fourth fastener means for conductively connecting said eighth end of said negative motor blade to a negative motor lead and;

a thermally conductive pad formed with said first module member supporting the circuit board.

2. The electronic control module according to claim 1, wherein said second module member is maintained in a sealed relationship with said first module member by at least one of said fastener means.

3. The electronic control module according to claim 1, wherein said first fastener means comprises a first threaded fastener extending through a first aperture disposed on said second end of said positive supply blade to engage a first threaded bore, said first threaded fastener being operative to clamp said second module member in a sealed relationship with said first module member.

4. The electronic control module according to claim 3, further comprises a first metallic bushing molded in said second module member adjacent to said first aperture such that said first fastener passes through said first aperture and said metallic bushing before engaging said first threaded bore.

5. The electronic control module according to claim 1, wherein:

said first fastener means comprises a first threaded fastener extending through a first aperture disposed on said second end of said positive supply blade to engage a first threaded bore in a brush card;

said second fastener means comprises a second threaded fastener extending through a second aperture disposed on said fourth end of said negative supply blade to engage a second threaded bore in said brush card, said first and second threaded fasteners being operative to clamp said second module member in a sealed relationship with said first module member;

said third fastener means comprises a third threaded fastener extending through a third aperture disposed on said sixth end of said positive motor blade to conductively engage said positive motor lead in a third bore; and said fourth fastener means comprises a fourth threaded fastener extending through a fourth aperture disposed on said eighth end of said negative motor blade to conductively engage said negative motor lead disposed in a fourth bore.

6. The electronic control module according to claim 1, further comprises a plurality of upstanding walls disposed between each of said first, second, third and fourth ends.

7. The electronic control module according to claim 1, wherein said positive and negative motor blades are disposed between said positive and negative supply blades.

8. An electronic control module for an electric motor comprising:

a first module member attached to said electric motor;

a second module member defining an interior and including circuit board mounting means for securely mounting a circuit board within said interior;

control signal connector means on said second module member and having therein control signal terminals, said control signal connector means allowing quick attachment and release of a control signal wire set to said control signal terminals;

a positive supply blade molded in said second module member spaced apart from said control signal connector means and having a first end disposed within said interior and connected to said circuit board and a second end protruding externally from said interior;

a negative supply blade molded in said second module member spaced apart from said control signal connector means and having a third end disposed within said interior and connected to said circuit board and a fourth end protruding externally from said interior;

a positive motor blade molded in said second module member spaced apart from said control signal connector means and having a fifth end disposed within said interior and connected to said circuit board and a sixth end protruding externally from said interior;

a negative motor blade molded in said second module member spaced apart from said control signal connector means and having a seventh end disposed within said interior and connected to said circuit board and an eighth end protruding externally from said interior;

a first threaded fastener connected to a positive supply lead and extending through a first aperture disposed on said second end of said positive supply blade to engage a first threaded bore in a brush card;

a second threaded fastener connected to a negative supply lead and extending through a second aperture disposed on said fourth end of said negative supply blade to engage a second threaded bore in said brush card, said first and second threaded fasteners being operative to clamp said second module member in a sealed relationship with said first module member;

a third threaded fastener extending through a third aperture disposed on said sixth end of said positive motor blade to conductively engage a positive motor lead disposed in a third bore of said brush card; and a fourth threaded fastener extending through a fourth aperture disposed on said eighth end of said negative motor blade to conductively engage a negative motor lead disposed in a fourth bore of said brush card.

9. The electronic control module according to claim 8, wherein said second module member is maintained in a sealed relationship with said first module member by at least one of said fastener means.

10. The electronic control module according to claim 8, wherein said first fastener means comprises a first threaded fastener extending through a first aperture disposed on said second end of said positive supply blade to engage a first threaded bore, said first threaded fastener being operative to clamp said second module member in a sealed relationship with said first module member.

11. The electronic control module according to claim 10, further comprises a first metallic bushing molded in said second module member adjacent to said first aperture such that said first fastener passes through said first aperture and said metallic bushing before engaging said first threaded bore.

12. The electronic control module according to claim 8, further comprises a plurality of upstanding walls disposed between each of said first, second, third and fourth ends.

13. The electronic control module according to claim 8, wherein said positive and negative motor blades are disposed between said positive and negative supply blades.

14. An electronic control module for an electric motor driven hydraulic pump comprising:

a hydraulic pump housing having a first module member portion integrally formed therewith;

a second module member defining an interior and including circuit board mounting means for securely mounting a circuit board within said interior;

control signal connector means on said second module member and having therein control signal terminals, said control signal connector means allowing quick attachment and release of a control signal wire set to said control signal terminals;

a positive supply blade molded in said second module member spaced apart from said control signal connector means and having a first end disposed within said interior and connected to said circuit board and a second end extending externally from said interior;

a negative supply blade molded in said second module member spaced apart from said control signal connector means and having a third end disposed within said interior and connected to said circuit board and a fourth end extending externally from said interior;

a positive motor blade molded in said second module member spaced apart from said control signal connector means and having a fifth end disposed within said interior and connected to said circuit board and a sixth end extending externally from said interior;

a negative motor blade molded in said second module member spaced apart from said control signal connector means and having a seventh end disposed within said interior and connected to said circuit board and a eighth end extending externally from said interior;

a first threaded fastener connected to a positive supply lead and extending through a first aperture disposed on said second end of said positive supply blade to engage a first threaded bore in a brush card;

a second threaded fastener connected to a negative supply lead and extending through a second aperture disposed on said fourth end of said negative supply blade to engage a second threaded bore in said brush card, said first and second threaded fasteners being operative to clamp said second module member in a sealed relationship with said first module member portion;

a third threaded fastener extending through a third aperture disposed on said sixth end of said positive motor blade to conductively engage a positive motor lead disposed in a third bore of said brush card; and a fourth threaded fastener extending through a fourth aperture disposed on said eighth end of said negative motor blade to conductively engage a negative motor lead disposed in a fourth bore of said brush card.

15. The electronic control module according to claim 14, wherein said second module member is maintained in a sealed relationship with said first module member portion by at least one of said fastener means.

16. The electronic control module according to claim 14, wherein said first fastener means comprises a first threaded fastener extending through a first aperture disposed on said second end of said positive supply blade to engage a first threaded bore, said first threaded fastener being operative to clamp said second module member in a sealed relationship with said first module member portion.

17. The electronic control module according to claim 16, further comprises a first metallic bushing molded in said second module member adjacent to said first aperture such that said first fastener passes through said first aperture and said metallic bushing before engaging said first threaded bore.

18. The electronic control module according to claim 14, further comprises a plurality of upstanding walls disposed between each of said first, second, third and fourth ends.

19. The electronic control module according to claim 14, wherein said positive and negative motor blades are disposed between said positive and negative supply blades.

* * * * *